US007631161B2

(12) United States Patent
Haustein et al.

(10) Patent No.: US 7,631,161 B2
(45) Date of Patent: *Dec. 8, 2009

(54) APPARATUS, SYSTEM, AND METHOD FOR WRITING DATA TO PROTECTED PARTITIONS OF STORAGE MEDIA

(75) Inventors: Nils Haustein, Zornheim (DE); Craig Anthony Klein, Tucson, AZ (US); Martin Roosen, Hochheim (DE); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/256,186

(22) Filed: Oct. 21, 2005

(65) Prior Publication Data

US 2007/0094470 A1   Apr. 26, 2007

(51) Int. Cl.
*G06F 12/14* (2006.01)
(52) U.S. Cl. .................... 711/163; 711/112; 360/60
(58) Field of Classification Search ............ 711/112, 711/163; 360/60
See application file for complete search history.

(56) References Cited

U.S. PATENT DOCUMENTS

| 5,163,141 | A | * | 11/1992 | Mueller et al. ............... 711/164 |
|---|---|---|---|---|
| 5,233,576 | A | | 8/1993 | Curtis et al. ................... 369/13 |
| 5,677,899 | A | * | 10/1997 | Getreuer ................... 369/44.28 |
| 6,233,667 | B1 | | 5/2001 | Shaylor et al. ............... 711/200 |
| 6,317,281 | B1 | | 11/2001 | Ogawa et al. |
| 6,594,780 | B1 | | 7/2003 | Shen et al. ..................... 714/15 |
| 6,724,554 | B1 | * | 4/2004 | Braithwaite et al. ........... 360/60 |
| 2003/0191979 | A1 | | 10/2003 | Whitten et al. .................. 714/6 |
| 2004/0148478 | A1 | | 7/2004 | Leung ......................... 711/163 |
| 2004/0186971 | A1 | | 9/2004 | Meharchand et al. ....... 711/163 |

* cited by examiner

*Primary Examiner*—Shane M Thomas
*Assistant Examiner*—Kaushikkumar Patel
(74) *Attorney, Agent, or Firm*—Kunzler & McKenzie

(57) ABSTRACT

An apparatus, system, and method are disclosed for writing data to protected partitions of storage media. The apparatus includes a control module configured to communicate with a host device and receive write commands for a storage device, a parse module configured to extract logical block addresses, a check module configured to verify a protection state, and a protection module configured to allow write commands according to the protection state. The system includes a host device, a storage device coupled with the host, the storage device comprising an enclosure having storage media and a control module, and the apparatus. The method includes communicating with a host device and receiving write commands for a storage device, extracting logical block addresses from the write commands, verifying a protection state of the extracted logical block addresses, and allowing write commands according to the protection state of the extracted logical block address.

14 Claims, 11 Drawing Sheets

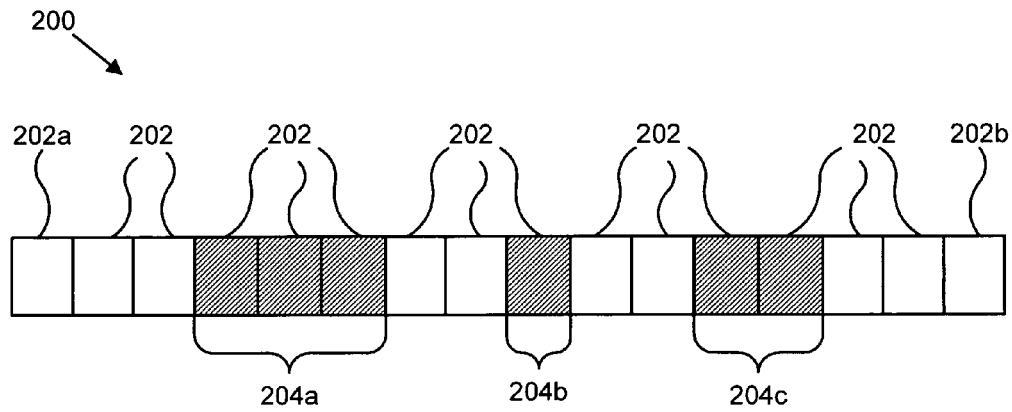
FIG. 2    (Prior Art)
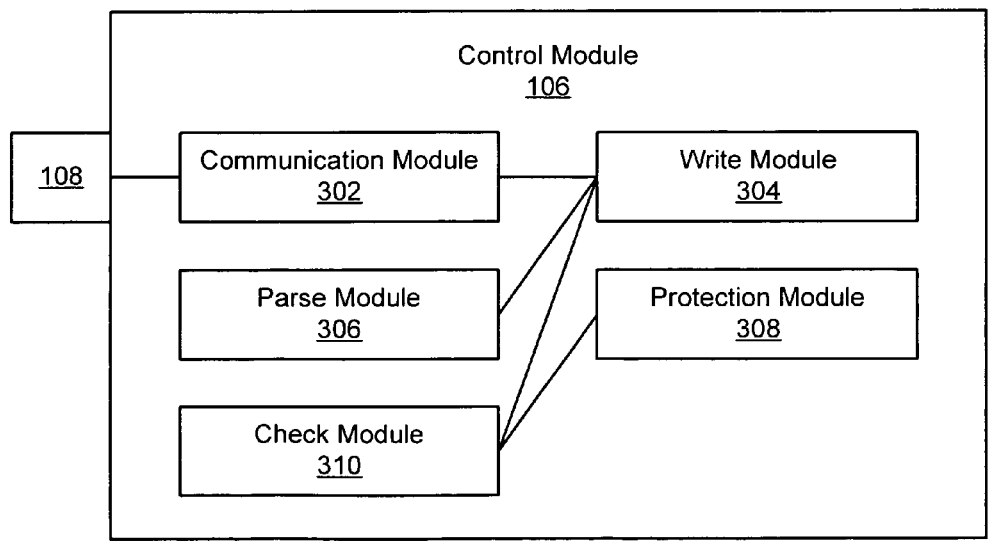
FIG. 3

Mode Select Command

| Byte | Bit | | | | | | | |
|---|---|---|---|---|---|---|---|---|
| | 7 | 6 | 5 | 4 | 3 | 2 | 1 | 0 |
| 0 | Command Code (15h) | | | | | | | |
| 1 | Logical Unit Number 506 | | | PF=1 | Reserved = 0 | | | SP |
| 2 | Reserved = 0 | | | | | | | |
| 3 | | | | | | | | |
| 4 | Parameter List Length | | | | | | | |
| 5 | VU = 0 | | | Reserved = 0 | | | Flag | Link |

502 points to the PF=1/Reserved/SP area; 504 points to the Parameter List Length area.

Mode Sense Command

| Byte | Bit | | | | | | | |
|---|---|---|---|---|---|---|---|---|
| | 7 | 6 | 5 | 4 | 3 | 2 | 1 | 0 |
| 0 | Command Code (1Ah) 602 | | | | | | | |
| 1 | Logical Unit Number 608 | | | RSVD | DBD | Reserved = 0 | | |
| 2 | PCF | | | Page Code 604 | | | | |
| 3 | Subpage Code | | | | | | | |
| 4 | Allocation Length 606 | | | | | | | |
| 5 | VU = 0 | | | Reserved = 0 | | | Flag | Link |

Mode Page

| Byte | Bit 7 | Bit 6 | Bit 5 | Bit 4 | Bit 3 | Bit 2 | Bit 1 | Bit 0 | |
|---|---|---|---|---|---|---|---|---|---|
| 0 | PS=1 | RSVD | Page Code = 0Dh | | | | | | 702 |
| 1 | Page Length = 17h (705, 706) | | | | | | | | 704 |
| 2 | WORM | ACT | Reserved = 0 | | | | | | |
| 3 | (MSB) | | | | | | | | 708 |
| 4 | Max. Number of Partitions = 00FFh | | | | | | | (LSB) | |
| 5 | (MSB) | | | | | | | | 710 |
| 6 | Protected Partition | | | | | | | (LSB) | |
| 7 | (MSB) | | | | | | | | |
| 8 | | | | | | | | | |
| 9 | | | | | | | | | |
| 10 | | | | | | | | | |
| 11 | Starting Boundary (LBA) | | | | | | | | 711 |
| 12 | | | | | | | | | |
| 13 | | | | | | | | | |
| 14 | | | | | | | | (LSB) | |
| 15 | (MSB) | | | | | | | | |
| 16 | | | | | | | | | |
| 17 | | | | | | | | | |
| 18 | | | | | | | | | 712 |
| 19 | Ending Boundary (LBA) | | | | | | | | |
| 20 | | | | | | | | | |
| 21 | | | | | | | | | |
| 22 | | | | | | | | (LSB) | |
| 23 | (MSB) | | | | | | | | 713 |
| 24 | Status | | | | | | | (LSB) | |

FIG. 7

WRITE Command

| | Bit 7 | Bit 6 | Bit 5 | Bit 4 | Bit 3 | Bit 2 | Bit 1 | Bit 0 |
|---|---|---|---|---|---|---|---|---|
| Byte 0 | Operation Code (2Ah) | | | | | | | |
| Byte 1 | Logical Unit Number | | | DPO | FUA | Reserved | | RelAdr |
| Byte 2 | Logical Block Address ~1004 | | | | | | | |
| Byte 3 | | | | | | | | |
| Byte 4 | | | | | | | | |
| Byte 5 | | | | | | | | |
| Byte 6 | Reserved | | | | | | | |
| Byte 7 | Transfer Length ~1006 | | | | | | | |
| Byte 8 | | | | | | | | |
| Byte 9 | Control Byte | | | | | | | |

FIG. 10

Partition Mode Page

| Bit / Byte | 7 | 6 | 5 | 4 | 3 | 2 | 1 | 0 |
|---|---|---|---|---|---|---|---|---|
| 0 | PS | Rsvd | PAGE CODE (11h) ~1101 ||||||
| 1 | PAGE LENGTH ||||||||
| 2 | MAXIMUM ADDITIONAL PARTITIONS ||||||||
| 3 | ADDITIONAL PARTITIONS DEFINED ||||||||
| 4 | FDP | SDP | IDP | PSUM | POFM | CLEAR | ADDP |
| 5 | MEDIUM FORMAT RECOGNITION ~1106 ||||||||
| 6 | 1104 | Reserved 1102 ||| PARTITION UNITS ||||
| 7 | Reserved ||||||||
| | Partition Size Descriptor(s) ||||||||
| 8 | MSB | PARTITION SIZE |||||||
| 9 | | | | | | | | LSB |
| n | MSB | PARTITION SIZE |||||||
| n-1 | | | | | | | | LSB |

FIG. 11

APPARATUS, SYSTEM, AND METHOD FOR WRITING DATA TO PROTECTED PARTITIONS OF STORAGE MEDIA

BACKGROUND OF THE INVENTION

1. Field of the Invention

This invention relates to storage media and more particularly relates to implementing protected partitions in storage media.

2. Description of the Related Art

The explosion of data created by e-business is making storage a strategic investment priority for companies of all sizes. As storage takes precedence, a major concern has emerged: the need to archive data in a non-rewritable and non-erasable manner. This need is based in part on the need to meet the legal requirements of the management of financial data, such as required by the Securities and Exchange Commission and HIPPA, as well as the archival of court records, customer records, and other long-lived information. Traditionally, optical media has been used to store date in non-rewritable and non-erasable form. Non-rewritable and non-erasable data may also be referred to as reference data, fixed content data, or Write Once Read Many (WORM) data.

Information technology providers are increasingly migrating WORM data to disk based storage subsystems due to the constantly dropping price and increasing storage capacity of the disks in the storage subsystems. A disk based storage subsystem may be part of a Storage Area Network. The Storage Network Industry Association (SNIA) defines SAN as a network whose primary purpose is the transfer of data between computer systems and storage elements. A SAN may comprise a communication infrastructure, which provides physical connections; and a management layer, which organizes the connections, storage elements, and computer systems so that data transfer is secure and robust. A SAN may also include a storage system comprising storage elements, storage devices, computer systems, and/or appliances, plus all control software, communicating over a network.

Commonly, a storage area network includes a plurality of storage devices, such as tape drives or hard disk drives, connected with a storage or disk controller. The disk controller is generally a server that is configured to process read/write requests from hosts or client machines. The hosts may be running a variety of operating systems such as Windows, Linux, UNIX, AIX, zOS, etc. In large computing environments, the storage area network is an ideal solution for providing large amounts of storage and scalable server or storage controller performance.

Typically, in a storage area network environment, a host requests data from the disk controller. The disk controller then retrieves the data from the particular storage device that contains the requested data, often referred to as a home location. The disk controller then sends the data to the host. If the host modifies the data, the data is sent back to the disk controller which returns the modified data to the home location. Typically, the host awaits a response from the disk controller indicating the read or write operation has completed. The home location often takes the form of a partition on the disk drive. A partition further comprises at least one unit of storage of fixed size, or at least one unit of storage of variable size. In one embodiment, the unit of storage of fixed size is a logical block address (LBA).

The disk controller may also provide functions such as the ability to provide access by heterogeneous servers, data caching, data availability features such as various RAID implementations and clustering, scalability, virtualization of devices, replication services and non-rewritable and non-erasable storage (WORM). WORM functionality is usually provided by microcode residing outside the storage device or disk drive, such as in the disk controller, which prevents modification, deletions, and additions to the data stored on disk drives. The disk drive is usually integrated and enclosed in the subsystem and cannot be removed. A storage subsystem providing WORM functionality is also referred to as WORM storage subsystem.

Even though WORM storage subsystems are becoming more and more accepted as a legal means of archiving reference data, there remains a security concern: the data on the disk drive is inherently rewritable and erasable. The only protections preventing the alteration or deletion of archived data are provided by the controller microcode, which does not allow modifications or deletions, and the physical protection of the disk drives, which are enclosed in a lockable rack or cabinet. When a disk drive is removed from the storage subsystem the data on that disk drive is no longer secure and may be overwritten, deleted or otherwise manipulated. To prevent this, the data can be formatted in a special way to make the alteration of the data more difficult, however, it is still possible to decode the format and manipulate the data. This puts the integrity of the archived data at more risk than in the past, when the physical nature of the medium provided a natural barrier to the modification of the data. Furthermore, current WORM systems typically depend on proprietary interfaces to the host computer or disk controller, which may introduce problems with the existing information technology infrastructure.

From the foregoing discussion, it should be apparent that a need exists for an apparatus, system, and method that implements protected partitions in hard disk drives. Beneficially, such an apparatus, system, and method would utilize a standardized interface and not require proprietary hardware or interfaces.

SUMMARY OF THE INVENTION

The present invention has been developed in response to the present state of the art, and in particular, in response to the problems and needs in the art that have not yet been fully solved by currently available partition protection systems. Accordingly, the present invention has been developed to provide an apparatus, system, and method for implementing protected partitions that overcome many or all of the above-discussed shortcomings in the art.

The apparatus to implement protected partitions is provided with a logic unit containing a plurality of modules configured to functionally execute the necessary steps of protecting partitions. These modules in the described embodiments include a control module configured to communicate with a host device and receive write commands for a storage device having at least one partition, and a parse module configured to extract logical block addresses from the write commands.

In a further embodiment, the apparatus includes a check module configured to verify a protection state of the extracted logical block addresses, and a protection module configured to allow write commands according to the protection state of the extracted logical block address. The apparatus may also include a plurality of protection states comprising an unprotected state configured to allow the performance of an indefinite number of read/write operations, and a Write Once Read Many (WORM) protected state configured to protect the partition from any attempted write, erase, and format command.

The plurality of protection states may also include an auto-protected state configured to allow exactly one write operation and subsequently convert to a read-only auto-protect state, and the read-only auto-protected state configured to prevent write, erase, and format command once data has been written to the partition.

In one embodiment, the apparatus includes a plurality of allowable protection state transitions. The protection state transitions may include a transition from the unprotected state to one of the unprotected state for normal read/write operation, the auto-protected state, protected state, and the WORM protected state, a transition from the auto-protected state to one of the unprotected state or the read-only auto-protected state, and a transition from the read-only auto-protected state to the WORM protected state.

In a further embodiment, the apparatus comprises a write module configured to write data to the storage device and perform protection state transitions of the partition. The storage device may be selected from the group consisting of hard disk drives, DVD-R, DVD-RW, DVD-RAM, HD-DVD, Blu-Ray, UDO, CD-R, CD-RW, magneto-optical, phase change, holographic, tape cartridge drives, tape cassette drives, and solid-state media. The partition may comprise at least one unit of storage of fixed size, or alternatively one unit of storage of variable size.

A system of the present invention is also presented to implement protected partitions in storage media. In particular, the system, in one embodiment, includes the above described apparatus, a host device, and a storage device coupled with the host. The storage device may include an enclosure containing storage media and the control module.

A method of the present invention is also presented for protecting partitions in storage media. The method in the disclosed embodiments substantially includes the steps necessary to carry out the functions presented above with respect to the operation of the described apparatus and system. In one embodiment, the method includes communicating with a host device and receiving write commands for a storage device, the storage device having at least one partition, and extracting logical block addresses from the write commands.

In a further embodiment, the method includes verifying a protection state of the extracted logical block addresses, and allowing write commands according to the protection state of the extracted logical block address. The method may also include writing data to the storage device and perform protection status transitions of the partition. Furthermore, the method includes allowing transitions from the unprotected state to one of the unprotected state for normal read/write operation, the auto-protected state, and the WORM protected state, WORM protected state, allowing transitions from the auto-protected state to one of the unprotected state or the read-only auto-protected state, and allowing transitions from the read-only auto-protected state to the WORM protected state Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a schematic block diagram illustrating one embodiment of Logical Block Addressing in accordance with the prior art;

FIG. 3 is a schematic block diagram illustrating one embodiment of the control module in accordance with the present invention;

FIG. 5 is a schematic block diagram illustrating one embodiment of a mode select command in accordance with the present invention;

FIG. 6 is a schematic block diagram illustrating one embodiment of a mode sense command in accordance with the present invention;

FIG. 7 is a schematic block diagram illustrating one embodiment of a mode page in accordance with the present invention;

FIG. 10 is a schematic block diagram illustrating one embodiment of a write command in accordance with the present invention;

FIG. 11 is a schematic block diagram illustrating one embodiment of a medium partition mode page in accordance with the present invention.

DETAILED DESCRIPTION OF THE INVENTION

Figure 1:
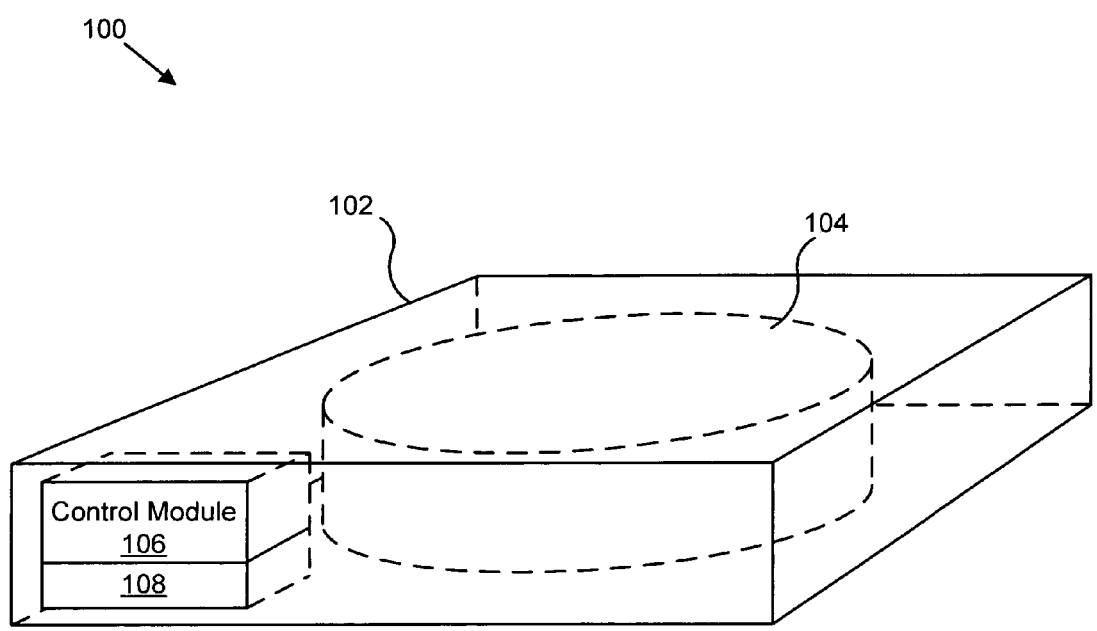
FIG. 1 is a schematic block diagram illustrating one embodiment of a storage device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-versatile disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a storage device 100 in accordance with the present invention. The storage device 100 may comprise an enclosure 102, storage media 104, a control module 106 and a communication interface 108. The storage media 104 may include, but is not limited to, magnetic, optical, and solid state storage media. Examples of magnetic storage media 104 include, but are not limited to, hard disk drives, and tape drives. The communication interface 108 may include, but is not limited to, HVD or LVD SCSI, fiber channel, ESCON, FICON and RS-232.

Examples of optical media include DVD-R (Digital Versatile Disk-Write Once), DVD-RW (DVD Rewritable), DVD-RAM (DVD Random Access Memory), HD-DVD (High Definition DVD), Blu-Ray, UDO (Ultra Density Optical), CD-R (Compact Disk-Write Once), CD-RW (CD Rewritable), magneto-optical (MO), phase change (PC), holographic, and the like. Examples of solid state storage media include volatile memory such as SDRAM, and non-volatile memory such as flash memory.

The control module 106 is configured to receive input and output requests (hereinafter "I/O requests or commands) through the communication interface 108 from a host and subsequently perform the I/O request. The control module 106 may be operatively coupled with the storage media 102 within the enclosure 102. Alternatively, the control module 106 may be configured to control a plurality of storage media 104 over a network. One such implementation includes a storage area network (not shown).

The control module 106 is configured to execute I/O requests, or read/write commands, that access the smallest unit of storage of the storage media 104. In one embodiment, the smallest unit of storage is the Logical Block Address (LBA). Logical block addressing translates physical locations of the storage media into addresses that can be used by the host. For example, logical block addressing translates the cylinder, head, and sector specifications of a hard disk drive into addresses that can be used by an operating system or basic input/output system (BIOS).

In a further embodiment, the control module 106 may connect to a host via a communication link and similarly to the storage media 104. As described above, the storage media 104 may comprise disk drives, tape drives, and/or optical drives via an alternative communication link. The communication interface 108 is further configured to receive the I/O request and pass the I/O request to the control module. The control module 106 may be configured to perform protocol conversion from ESCON to SCSI or from FICON to SCSI. Furthermore, it may be configured to group the attached storage media 104 into logical drives or volumes. The control module 106 may also offer advanced functions, such as Remote Volume Mirroring, PPRC (Peer-to-Peer Remote Copy), XRC (Extended Remote Copy), SnapShot, Flashcopy, etc.

FIG. 2 is a schematic block diagram illustrating one embodiment of Logical Block Addressing 200 in accordance with the prior art. Logical block addressing 200 may be used in fixed block architecture (FBA) systems such as hard disk drives, optical disk drives, and removable storage drives. In FBA peripherals, I/O is done by executing read/write commands that access the LBA. A LBA references a fixed amount of data.

Storage media 104 may comprise millions of LBAs, depending upon the capacity of the storage media. FIG. 2 illustrates a plurality of LBA, each LBA represented as a single box 202. As is well known to those skilled in the art, LBA may be written in any order, and need not be written sequentially from a first LBA 202a, to a last LBA 202b.

The last LBA 202b may also be called the maximum LBA. The capacity of the storage media 104 disk drive is determined by the number of LBAs on the medium and the fixed size of the LBAs 202. For example, assuming a typical LBA size of 512 bytes, a hard disk drive with 10,000,000 LBAs accounts for a capacity of 5.12 billion bytes.

A partition 204 is an isolated portion of the storage media 104 that may behave as a separate storage media 104. The partition 204 comprises at least one LBA 202. For example, partition 204a may comprise three LBAs 202, while partition 204b comprises one LBA 202, and partition 204c comprises two LBAs 202. Alternatively, the partition 204 may comprise millions of LBAs 202. Storage media 104 may comprise multiple partitions with each partition 204 having a different protection state. In a further embodiment, partitions 204 never overlap, meaning that any two partitions do not contain the same LBA 202.

FIG. 3 is a schematic block diagram illustrating one embodiment of the control module 106 in accordance with the present invention. The control module 106, in one embodiment, comprises a communication module 302, a write module 304, a parse module 306, a protection module 308, and a check module 310. The communication module 302 is 302 is configured to communicate with the host via the communication interface 108 in order to receive read/write commands and subsequently pass write commands to the write module 304 or return data to the host as a result of a read command.

In a further embodiment, the parse module 306 is configured to extract logical block addresses and protection statuses from the read/write command. The check module 310 is configured to verify the protection status of partitions 204 and LBAs 202 of the storage media 104. The protection module 308 is configured with a plurality of protection states and allowable transitions between the protection states. The protection module 308 will be discussed in greater detail below with reference to FIG. 4. The write module 304 is configured to write data to the storage media 104 and perform protection status transitions.

Figure 4:
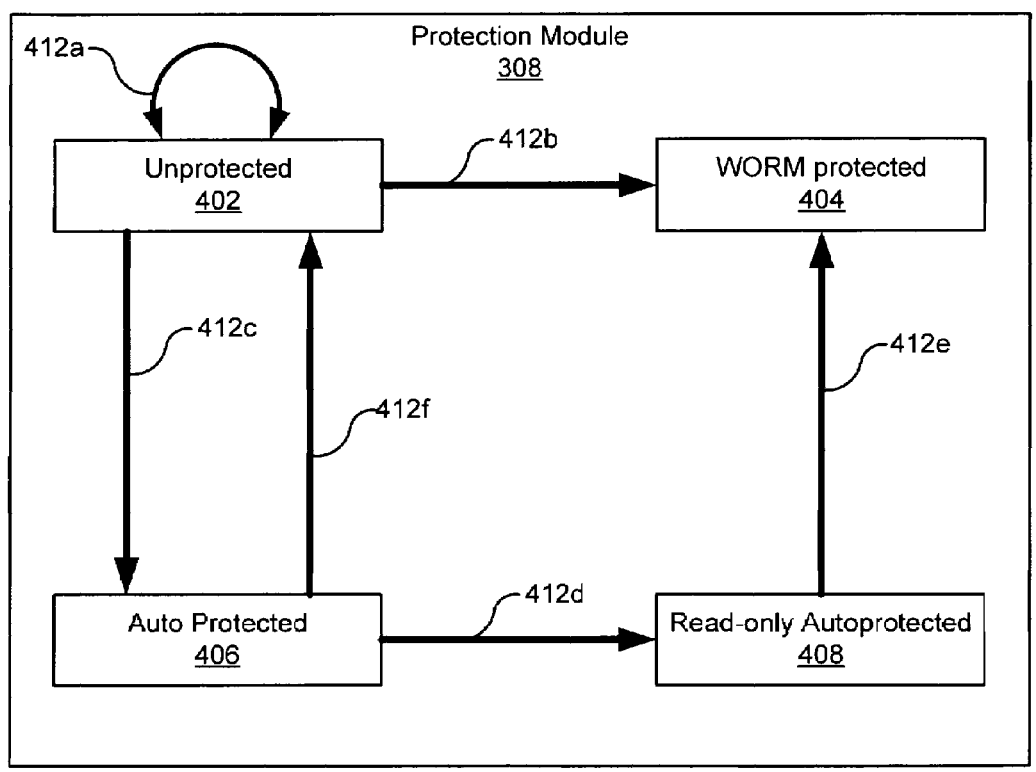
FIG. 4 is a schematic block diagram illustrating a plurality of protection states in accordance with the present invention.

FIG. 4 is a schematic block diagram illustrating a plurality of protection states in accordance with the present invention. In one embodiment, the protection states may implemented within the protection module 308. The protection module 308 may comprise an unprotected state 402, a Write Once Read Many (WORM) protected state 404, an auto-protected state 406, and a read-only auto-protected state (hereinafter "read-only state") 408. The unprotected state 402 may be the default factory setting for the entire storage media 104, and allows the performance of an indefinite and repeated number of read/write operations to any LBA 202.

This unprotected state 402 remains set for those areas on the storage media 104 that are not explicitly configured with the WORM state 404 or the auto-protected state 406. The WORM state 404 is configured to protect any partition 204 associated with "WORM Protected" from any attempted write, erase, or format operation. The auto-protected state 406 allows any LBA 202 in an "auto-protected" partition 204 to be written exactly once, and after successfully completing the write operation the LBAs 202 will automatically transition to the "read-only auto-protect" state 408. The remaining LBAs 202 in the partition that have not been written will remain in auto-protected state 406. The read-only auto-protect state 408 is configured to prevent any write, erase, and format operations once the LBA 202 has been once the LBA 202 has been written.

Arrows 412 represent rules illustrating allowable state transitions of the protection state for a partition 204. For example, the protection module 308 is configured to allow a partition 204 having an unprotected state 402 to allow rewriting of the data as indicated by arrow 412a. The unprotected state 402 may be transitioned 412b to a WORM protected state 404 by issuing an appropriate state transition command which will be explained below. Alternatively, the unprotected state may also be changed 412c to the auto-protected state 406 as a result of a state transition command. As illustrated, the WORM protected state 404 may be configured to not allow any state transitions.

The auto-protected state 406 may be configured to allow exactly one successful write command to be issued to the partition 204. When a write command has been successfully processed, the protection state for an auto-protected partition 406 will transition 412d to the read-only auto-protected state 408. While there are unwritten LBAs 202, the written LBAs 202 are marked as read-only auto protected 408, while the unwritten LBAs 202 remain in the auto-protected state 406. Once all LBAs 202 in an auto-protected partition have been written, all LBAs 202 within the partition become 412e WORM protected 404.

In a further embodiment, a partition with the auto-protected state 406 may also be changed to the unprotected state 402 by sending an appropriate state transition command 412f. This, for example, enables correction of unwanted state changes, e.g. if the state of a partition has been set from unprotected to auto-protected by mistake.

Once a partition is in the WORM protected state 404 or read-only auto-protected state 408, the data cannot be overwritten, deleted or otherwise manipulated. Furthermore, the WORM protection state 404 and the read-only auto-protected state 408 cannot be reset once assigned. This means that any I/O requests for write, erase or format operations addressing any LBA pertaining to WORM protection state 404 or read-only auto-protected state are rejected by the control module 106. In a further embodiment, a LBA 202 in an auto-protected 406 partition remains auto-protected until it is written. If at least one LBA 202 within the auto-protected 406 partition has been written the partition changes to read-only auto-protected 408. If the last LBA 202 in an auto-protected partition 406 is written, the read-only auto-protected 408 partition will transition to a WORM 404 protected partition.

In one embodiment, the protection states 402, 404, 406, 408 may be represented in inquiry commands as binary values, denoted by a b suffix, or decimal values (shown in parentheses). For example, the unprotected state 402 may be represented as 00b (0 decimal), the WORM state 404 may be represented as 01b (1 decimal), the auto-protected state 406 may be represented as 10b (2 decimal), and the read-only auto protected state 408 may be represented as 11b (3 decimal).

In a further embodiment, the protection module 308 includes a virtually deleted protected state (not shown). This virtually deleted state may be configured to denote that the WORM or auto-protected data has been "virtually deleted." The virtually deleted data would still be read-accessible by the host for historical purposes, but the data would be ear-marked as "virtually deleted" for whatever reason, such as the data is considered out-of-date or no longer relevant.

FIG. 5 is a schematic block diagram illustrating one embodiment of a mode select command 500 in accordance with the SCSI-3 Interface Standard. The illustrated mode select command 500 is the SCSI (Small Computer System Interface) command with command code 15h 502. The mode select command 500 is given herein by way of example for a state transition command. For example, the mode select command 500 may be used to initiate the transition 412b from an unprotected state 402 to WORM protected state 404 or 412c from unprotected state 402 to auto-protected state 406 or 412f from auto-protected state 406 to unprotected state 402. The mode select command 500 may be initiated by the host system (subsequently also called initiator) and received by the control module 106 via the communication interface 108 of the storage device 100. Mode select command 500 with command code 15h 502 provides a means for the host to specify the parameter list length 504 and logical unit 506 of the target storage device. The parameter list length 504 specifies the size of the mode page to be transferred in bytes. The Mode Select command 500 is always succeeded by a mode page sent from the host system to the storage device 100.

FIG. 6 is a schematic block diagram illustrating one embodiment of a mode sense command 600 in accordance with the present invention. The mode sense command 600 allows the host to retrieve or inquire mode page information, such as from a mode page from the storage device 100. The mode sense command 600 may be initiated by the host system (subsequently also called initiator) and received by the control module 106 via the communication interface 108 of the storage device 100. The command code 602 of the SCSI Mode Sense command is 1Ah. The mode sense command 600 allows the host to specify a page code 604, and an allocation length 606, which in turn specifies the maximum returned data size. Page code 604 specifies the page code of the mode page to be retrieved, and logical unit 608 of the target storage device. The allocation length specifies the length of the mode page. As a result of the mode sense command 600 the storage device receiving it will return the appropriate mode page.

FIG. 7 is a schematic block diagram illustrating one embodiment of a mode page 700 in accordance with the present invention. Allocation length 606 of FIG. 6 specifies the number of bytes to be transferred from the storage media 104 to the host as result of the mode sense command 600, this is the size of the mode page 700. In one embodiment, the mode sense command 600 will allow the host to obtain the protection state of a partition or an individual LBA.

The mode page 700, sent by storage device as a response to the mode sense command 600, allows the host system to inquire the state of a partition or LBA. Not all fields in the mode page 700 are used by the mode sense command. For example if the mode sense command 600 field 604 is set to 0Dh specifying for mode page code 0Dh the storage device may return the mode page 700 with the following characteristic: field 702 is set to 0Dh, field 0Dh, field 704 is set to 17h, field 705 is set to 1 if the storage device is capable of supporting WORM partitions, field 706 is set to 1 if at least one protected partition is activated, field 708 return the number of protected partitions which exist within the storage device, field 710 returns the number of the partition where the subsequent fields 711, 712 and 713 apply to, field 711 specifies the start address (or LBA) of the partition, field 712 outlines the end address of the partition and field 713 returns the protection status of that partition state which is one of unprotected 00b, WORM protected 01b, auto-protected 10b or read-only auto-protected 11b. In this sequence the storage device will return the mode page 700 multiple times for each partition which is configured.

The mode select and mode sense command can be used in combination to make an inquiry of the protection parameters such as the starting and ending address (LBA) and protection state of a particular partition. The sequence starts with sending a mode select command 500 specifying 15h in field 502 and 17h in field 504 and the logical unit address of the storage device in field 506. Subsequently mode page 700 is sent with field 710 set to the number of the partition for which the information is requested, and all other fields in mode page 700 are set to 00h indicating that this is not a state transition. These two commands are sent from the host (initiator) to the storage device.

In one embodiment, the host then sends a mode sense command 600 with field 602 set to 1Ah, field 604 set to 0Dh and field 606 set to 17h indicating the expected length of the mode page. Field 608 is set to the address of the storage device. As a response to this command sequence the storage device returns mode page 700 where field 702 is set to 0Dh, field 704 is set to 17h, field 705 is set to 1 if the storage device is capable of supporting WORM partitions, field 706 is set to 1 if at least one protected partition is activated, field 708 returns the number of protected partitions which exist within the storage device, and field 710 returns the number of the partition for which the information is requested. In one embodiment, this number may be the same number which was sent previously. Field 711 specifies the start address (or LBA) of the partition, field 712 outlines the end address of the partition and field partition and field 713 returns the protection status of that partition state which is one of unprotected 00b, WORM protected 01b, auto-protected 10b or read-only auto-protected 11b.

According to the SCSI standard, the mode pages are used bidirectionally between the storage device and the host system. In this invention, the host system uses the mode page 700 in association with a MODE SELECT command to initiate a state transition. The host system also uses this mode page 700 in association with a MODE SENSE command to inquiry the status of a partition or LBA. The storage device derives the protection state for the partition(s) from the mode page. Therefore the mode pages are stored in the storage device. There are usually multiple mode pages, and each mode page has a unique page code. The page code for the protected partition mode page is exemplary set to 0Dh.

The page code 702 indicates that a protected partition is to be set. This is the unique page code which is used by the host system to initiate state transitions or inquiry state transitions. The page code of the protected partition mode page is exemplary set to 0Dh. The field 704 or the mode page 700 defines the length of this mode page in bytes, for this example it is set to 25 bytes. The field WORM 705 indicates whether or not the WORM Protection Mechanism is supported by the product and is only used for to inquiry protection states. The field Act 706 indicates at least one Protected Partition is activated. This field is also used with an inquiry command operation. If this field is set to "0" there are no protected partitions set. Otherwise, there are protected partitions set on this disk drive.

The field Maximum Number of Partitions 708 denotes the maximum number of partitions, that can be configured with a start and end address, e.g. an LBA address. This field is used with the inquiry operation. This is a product specific value and is usually assigned during manufacturing of the storage device. This value must not exceed FFFEh. With the field protected partition 710 an existing partition can be specified. Setting this field to a value of "0" specifies all partitions. A value of FFFFh indicates that the information for a particular LBA as specified in field 711 is to be returned.

The starting boundary 711 indicates the LBA at which this partition subject to the state transition or inquiry operation starts. The ending boundary 712 specifies at which LBA this partition subject to the state transition or inquiry operation ends. The field 711 and 712 shall be greater than 0 and the ending boundary 712 must be equal or greater than the Starting boundary 711. The protection status 713 specifies the protection status for this partition state which is one of either unprotected 00b, WORM protected 01b, auto-protected 10b or read-only auto-protected 11b.

As outlined earlier, a protection status may be configured for a single LBA or a range of LBA based on the allowable transitions in FIG. 4. Every consecutive series of LBAs that are to be associated with a protection status of either 00b, 01b, 10b, or 11b is a protected partition. Hence, a protected partition may consist of any number of LBAs, from 1 to the maximum number of LBAs on the medium.

In one embodiment, the control module 106 is configured to receive existing SCSI commands, such as mode select 500 and mode sense 600 in order to create partitions with a WORM protected state 404 or auto-protected state 406, or retrieve the partition state that may be an unprotected state 402, a WORM protected state 404, an auto-protected state 406 or a read-only auto-protected state 408. The mode page 700 includes information 710, 711, 712, 713 about a partition and the protection parameters such as the range of LBAs and protection status to be set. The protection module 308 may be configured to utilize the allowable states 402, 404, 406, 408 in accordance with the creation and manipulation of partitions.

FIG. 7 gives by way of example mode page 700 code 0Dh 702 as one embodiment to implement the present invention. Alternatively, one skilled in the art of SCSI commands will recognize that a different page code of a reserved and not used mode page according to the SCSI standard may also be used. The mode page 700 is used bidirectional between the storage device 100 and the host. The host may utilize the mode page 700 in association with a mode select 500 command to create partitions, i.e. "to select the mode." The host uses this mode page 700 in association with a mode sense 600 command to specify a partition for which the protection state 402, 404, 406, 408 is to be retrieved. The control module 106 may also use the mode page 700 to obtain the data residing in the partition and the corresponding protection state 402, 404, 406, 408 and also to return it when requested to the host.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
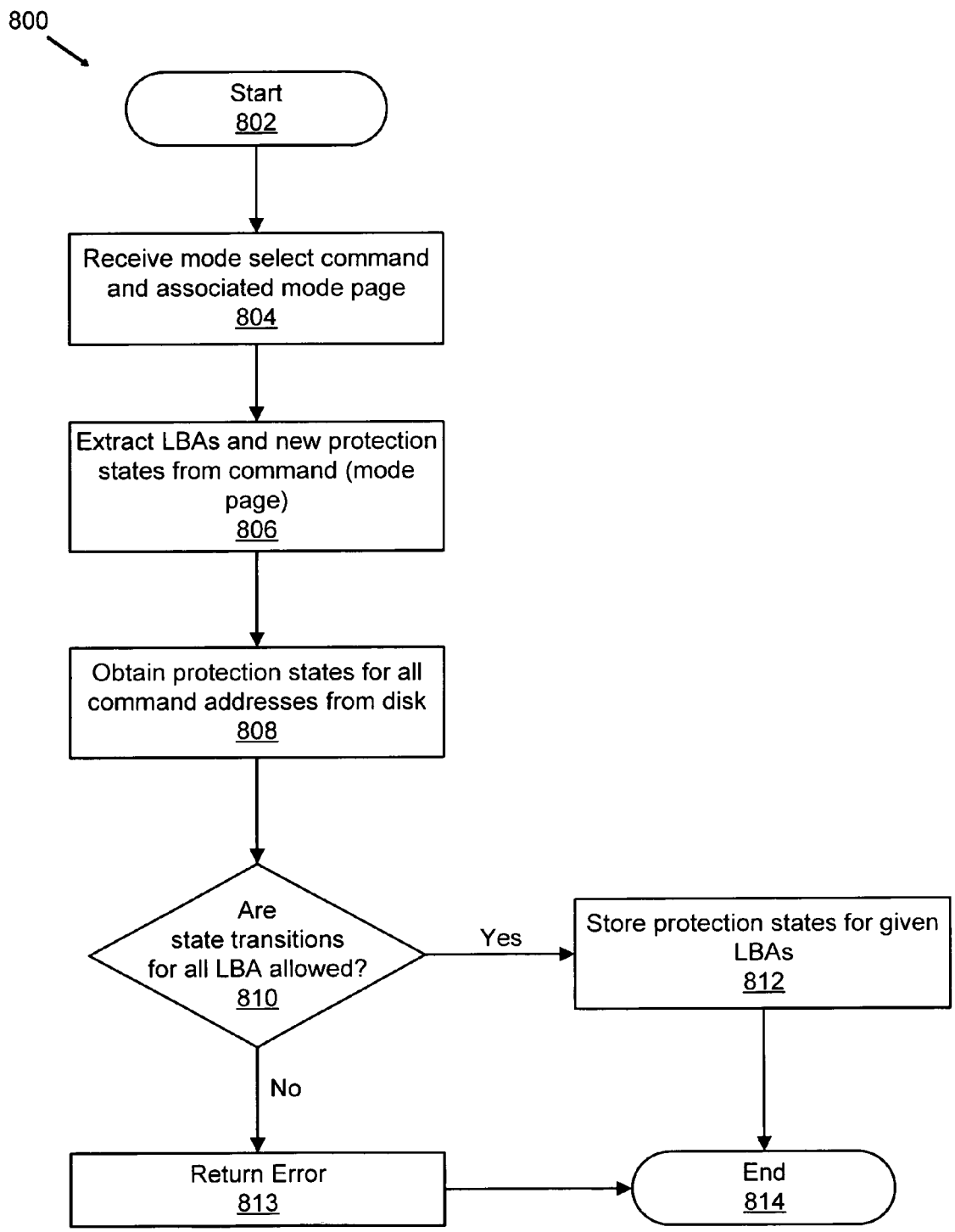
FIG. 8 is a schematic flow chart diagram illustrating one embodiment of a method for implementing allowable protection state transitions in accordance with the present invention.

FIG. 8 is a schematic flow chart diagram illustrating one embodiment of a method 800 for implementing allowable protection state transitions in accordance with the present invention. The method 800 starts 802 and the communication module 302 of the control module 106 receives 804 the mode select command 500 and the mode page 700 via interface 108. The parse module 306 then extracts 806 the LBAs and the new protection state from the mode page 700. Extracting 806 the LBAs and the protection state may comprise generating a list of LBAs and the new protection state. The check module 310 then verifies the actual protection states of those LBAs being obtained. In one embodiment, the actual state is the protection state the storage media 104 has associated with each requested LBA. The LBA. The check module 310 then obtains 808 the actual protection states for the list of LBAs extracted from the command.

The protection module 308 then compares the new protection state with the actual protection state and determines if the status transition is allowable 810. In one embodiment, the allowable transitions are predetermined and defined as described above with reference to FIG. 4. If the transition to the new protection state is allowed 810 for each LBA extracted 804 from the mode page, the write module 304 stores 812 the new protection state and the method 800 ends 814 upon the communication module 302 returning a success response to the host. However, if the transition is not allowed 810 for any of the LBAs, the protection module 308 prevents the transition and the communication module 302 returns 813 an error such as a SCSI check condition status to the host. In one embodiment, the error may be an "abnormal end of task," or abend, error message. The method 800 then ends 814.

In one embodiment, the storage media 104 may be configured to store the information given by the mode select command 500 in an internal memory which may be part of the check module 310. For example, with an affordable 1 MB memory chip the information of approximately 40,000 protection partitions may be stored. This internal memory allows a fast access to this data for subsequent operations, such as processing write commands. In a further embodiment, the protection partition information may be periodically written to the reserved area on the storage media 104, typically during idle time.

Figure 9:
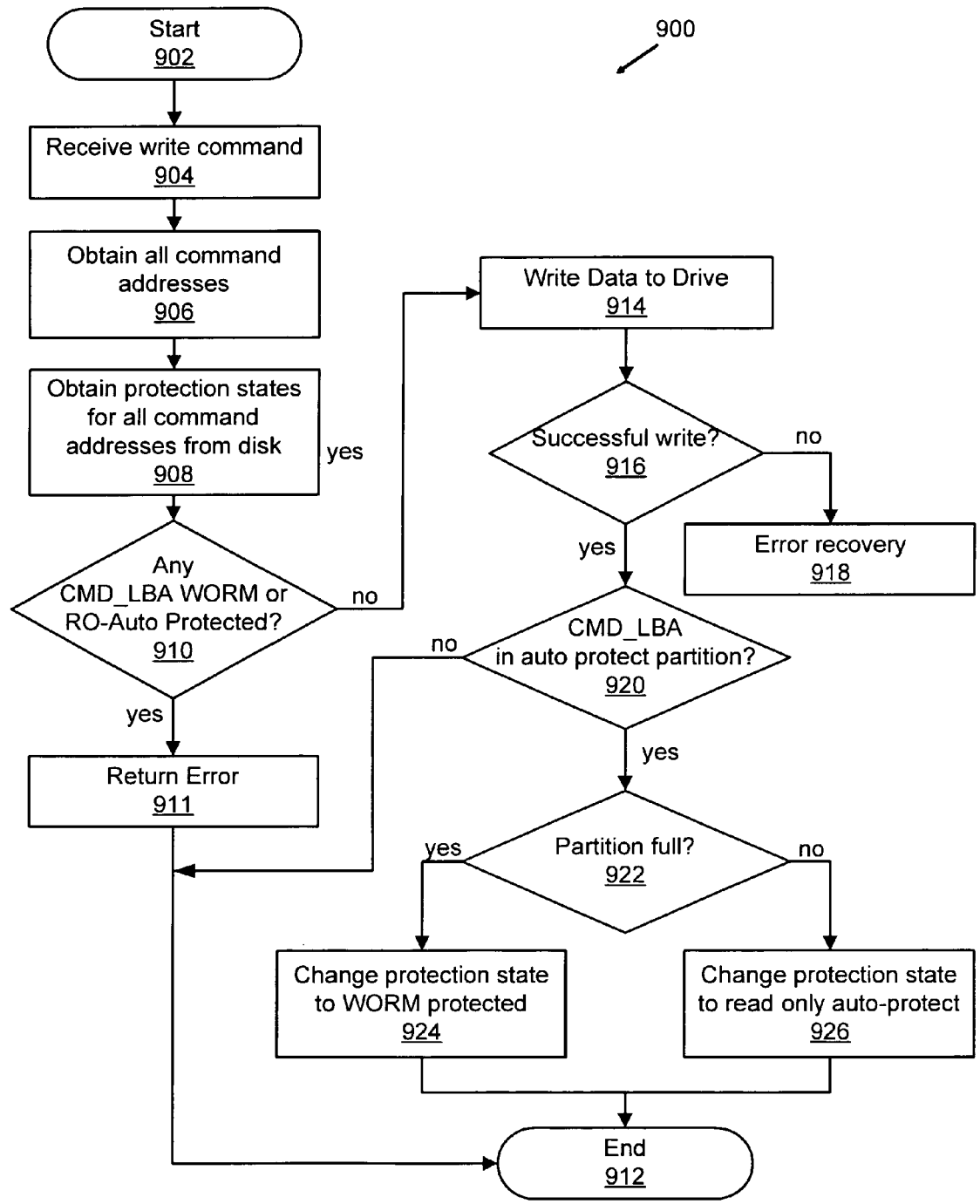
FIG. 9 is a schematic flow chart diagram illustrating one embodiment of a method for the processing of write commands.

FIG. 9 is a schematic flow chart diagram illustrating one embodiment of a method 900 for the processing of write commands. The method 900 begins 902 and the communication module 302 receives 904 a write command via the communication interface 108. The parse module 306 then obtains 906 all command addresses (LBAs) from the write command such as write command 1000. The command addresses comprise a starting LBA where the data is to be written to, as well as the transfer length, which indicates the number of sequential LBAs to be written. The check module 310 then obtains 908 the actual protection protection states for the command addresses (LBAs). The LBAs obtained 906 from the write command 1000 may be referred to as "CMD_LBA." The protection module 308 then compares the addresses from the command with the corresponding protection states on the storage media 104. If the protection module 308 finds that the CMD_LBA correspond 910 to WORM-protected areas or read-only (RO) auto-protected areas, the protection module 308 prevents the write command and the communication module 302 returns 911 an error message, and the method 900 ends 912. In one embodiment, the error message may comprise the abend error message described above.

Alternatively, if the check module 310 finds 910 that all CMD_LBA are assigned to writeable partitions, then the write module 304 writes 914 the data to the storage media 104. If the write was not successful 916, then the control module 106 starts an error recovery process 918. Determining the success of a write could be, in one embodiment, made by performing a write-verification or reading of the freshly written data. If the write was successful 916 the protection module 308 determines 920 if the freshly written data was written to an auto-protected partition 406. If not, the method 900 ends 912. Alternatively, if so, the write module 304 is configured to determine 922 if the partition is full. The partition is full if all LBAs pertaining to that partition are in state read-only auto-protected 408. This information is obtained from the check module 310.

If the partition is full, the write module 304 changes 924 the protection state of the partition to WORM-protected 404. If the partition is not full, the write module 304 changes 926 the protection status of the just-written LBAs and the partition itself to read-only auto-protect 408. The method 900 then ends 912.

FIG. 10 is a schematic block diagram illustrating one embodiment of a write command 1000 having a logical unit number (LUN) 1002 in accordance with the present invention. The write command 1000 may also include a starting LBA 1004, bytes 2-5, and a transfer length 1006, bytes 7-8. In one embodiment, the CMD_LBAs are obtained from the starting LBA 1004 and the transfer length 1006 divided by the LBA size plus one is equivalent equivalent to the ending LBA for that write command 1000. In one embodiment, the logical unit numbers 1002 inherent in every SCSI interface may be used to sort rewriteable data from WORM data. For example, rewritable data I/O 402 may be sent across a first logical unit number (LUN-0) of the communication interface 108 of the storage device 100. Auto-protected 406 data I/O could be sent across LUN-2 of the same communication interface 108 of the same storage device 100. WORM protected 404 I/O could be sent across LUN-3 of the same communication interface 108 of the same storage device 100. Data sent through LUN-0 may be saved on a different partition that that of the data of LUN-2 and LUN-3.

In order to maintain the data protection attribute of the protection states 402, 404, 406, 408, certain commands are prohibited. For example, the format unit command and the erase command will not be supported on partitions of the storage media 104 which are in protection state WORM protected 404, auto-protected 406 and read-only auto-protected 408. In general, all commands which would allow changing or deleting the data stored in a WORM protected or read-only auto-protected partition are prohibited and rejected by the storage controller via check condition.

FIG. 11 is a schematic block diagram illustrating one embodiment of a medium partition mode page 1100 in accordance with the present invention. Mode page 1100 is designated by page code 11h 1101. The control module 106 may be easily adapted to control single-reel tape cartridges and dual-reel tape cassettes. A tape cartridge or cassette can have multiple partitions which may be managed from the host via mode set commands. Thus for a particular partition on the tape cartridge or cassette, the protection state can be set to (a) unprotected, (b) WORM protected, and (c) auto-protected.

The mode pages may be used to transfer information about the protection state from the host to the tape drive. FIG. 11 illustrates the medium partition mode page 1100, according to INCITS T10/1434-D. Two bits 1104, 00b-11b of the reserved field 1102, which have been previously discussed, can be used to denote the protection state for the partition. In one embodiment, the Medium Format Recognition field 1106 may be used to denote the protection state, especially if tape is being used as the storage medium. Herein a scheme can be incorporated which shows the protection state of a particular partition encoded in the byte and bits. Alternatively, device drivers that convert the SCSI mode sense and mode select commands to ATA or IDE commands, for example, may be developed to extend the present invention to non-SCSI devices.

For stand-alone tape drives, the tape drive may store the protection state for a partition and for each logical block in that partition in the initialization area for each partition of each removable tape cartridge or cassette. In one embodiment, the protection state for each partition may be stored in both the initialization area of the tape cartridge or cassette and in cartridge or enclosure memory.

Figure 12:
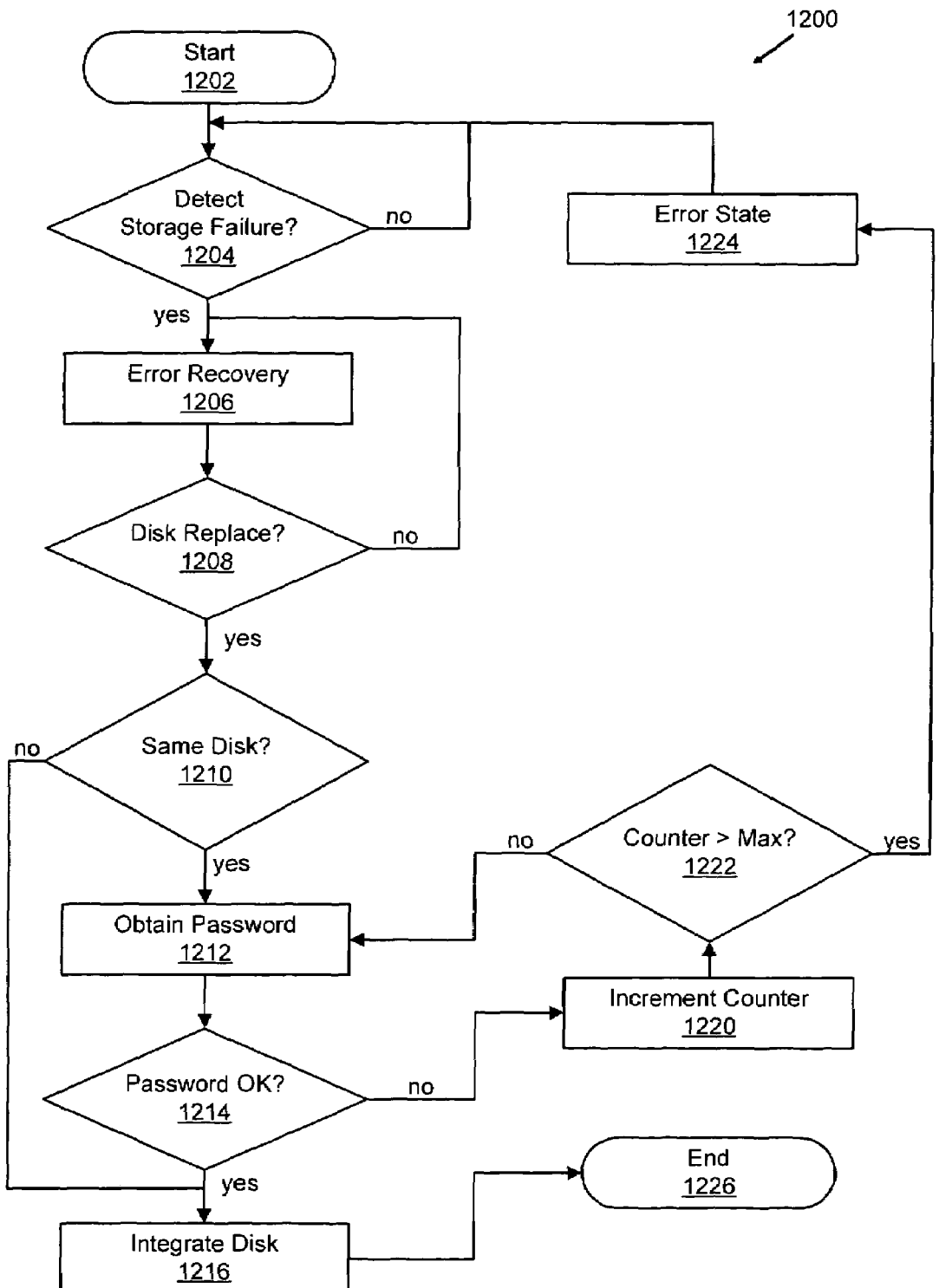
FIG. 12 is a schematic block diagram illustrating one embodiment of a method for protecting the control module 106 from intentional corruption of storage devices.

FIG. 12 is a schematic block diagram illustrating one embodiment of a method 1200 for protecting the control module 106 from intentional corruption of storage devices 100. An example of intentional corruption of storage devices 100 would be someone intentionally taking out a disk pertaining to a WORM protected entity and modifying the data contained within. In one embodiment, the method 1200 starts 1202 and the control module 106 detects 1204 that storage media 104 is broken.

Upon detecting 1204 a storage media 104 failure, the control module 106 is configured to start 1206 appropriate error recovery and posts an error message If no failure has been detected 1204 the method 1200 continuously checks for disk failures. One example of an appropriate error recovery in a RAID system is, for example, to rebuild the RAID. When the disk drive has been replaced 1208, the control module 106 checks 1210 whether the same disk has been inserted again, as this could point to intentional manipulation, where someone removes the disk, manipulates it and re-inserts it. In one embodiment, checking 1210 for the same disk comprises comparing the unique serial number and manufacturer ID of the storage device 100. If the disk is not the same disk as was previously removed, the control module 106 considers this a new disk and integrates 1216 the disk.

If the disk is 1210 the same disk as before the control module obtains 1212 the the passwords to override the protection. The password must be entered by the user that inserted the disk. If the passwords are not correct 1214 the control module 106 increments 1220 a counter. The counter is configured to maintain the number of incorrect password attempts. If the counter is greater 1222 than a predefined maximum, the control module 106 will isolate the storage media 104 and return 1224 an error state. The error may denote a state where an unauthorized attempt to manipulate the data has been detected and eliminated. If the counter is not greater 1222 than the maximum, the control module 106 again attempts to obtain the password 1212 from the user.

When the passwords are validated 1214, the control module 106 will integrate 1216 the disk. For example, in the case of an RAID array a rebuild will start. If the disk is the same as before the controller module 106 will attempt to perform diagnostics with the disk and scan the medium for possible defects. If no defects are found the data of the disk is considered valid and so the integration might not require a rebuild. However, if the disk is 1210 not the same, the control module 106 integrates 1216 the disk and considers it a new empty disk. This will require a rebuild. The method 1200 then ends 1226.

The present invention may be embodied in other specific forms without departing from its spirit or essential characteristics. For example, the SCSI commands described herein could be implemented over a Fibre Channel ("FC") physical layer. Alternately, other protocols, such as FICON, Ethernet, Gigabit Ethernet, Infiniband, TCP/IP, iSCSI, ATA, SATA, and the like, could be used without limitation. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for writing data to protected partitions of storage media, the apparatus comprising:
  a communications module comprising executable code stored on a semiconductor device, executed by a processor, and configured to communicate with a host device and receive write commands for a storage device having at least one partition, each partition comprising a plurality of logical block addresses;
  a parse module comprising executable code stored on the semiconductor device, executed by the processor, and configured to extract a logical block address of a first partition from a Small Computer System Interface (SCSI) mode page of the write commands;
  a check module comprising executable code stored on the semiconductor device, executed by the processor, and configured to verify a protection state of the extracted logical block address; and
  a protection module comprising executable code stored on the semiconductor device, executed by the processor, and configured to allow write commands according to the protection state of the extracted logical block address, the protection state selected from a plurality of protection states comprising an unprotected state;
an auto-protected state configured to allow exactly one write operation to the extracted logical block address;
a read-only auto-protected state configured to prevent reset, write, erase, and format commands to the extracted logical block address after the extracted logical block address is written to once, wherein at least one logical block address in the first partition is unwritten to;
a Write Once Read Many (WORM) protected state configured to prevent reset, write, erase, and format commands to all logical block addresses in the first partition; and
the protection module further configured to allow only extracted logical block address protection state transitions from the unprotected state to the auto-protected state, from the unprotected state to the WORM protected state, from the auto-protected state to the unprotected state in response to a reset, from the auto-protected state to the read-only auto-protected state when the extracted logical block address is written to, and from the read-only auto-protected to the WORM protected state when each logical block address in the first partition is written to.

2. The apparatus of claim 1, further comprising a write module comprising executable code stored on the semiconductor device, executed by the processor, and configured to write data to the storage device and perform protection state transitions of the first partition.

3. The apparatus of claim 1, wherein the storage device is selected from the group consisting of hard disk drives, DVD-RW, DVD-RAM, CD-RW, magneto-optical, phase change, holographic, tape cartridge drives, tape cassette drives, and solid-state media.

4. The apparatus of claim 1, wherein the first partition further comprises at least one unit of storage of fixed size.

5. The apparatus of claim 1, wherein the first partition further comprises at least one unit of storage of variable size.

6. A system for writing data to protected partitions of storage media, the system comprising:
a host device;
a storage device coupled with the host, the storage device comprising an enclosure having storage media and a communications module;
the communications module comprising executable code stored on a semiconductor device, executed by a processor, and configured to communicate with the host host device and receive write commands for the storage device, the storage device having at least one partition, each partition comprising a plurality of logical block addresses;
a parse module comprising executable code stored on the semiconductor device, executed by the processor, and configured to extract a logical block address of a first partition from a SCSI mode page of the write commands;
a check module comprising executable code stored on the semiconductor device, executed by the processor, and configured to verify a protection state of the extracted logical block address; and
a protection module comprising executable code stored on the semiconductor device, executed by the processor, and configured to allow write commands according to the protection state of the extracted logical block address, the protection state selected from a plurality of protection states comprising
an unprotected state;
an auto-protected state configured to allow exactly one write operation to the extracted logical block address;
a read-only auto-protected state configured to prevent reset, write, erase, and format commands to the extracted logical block address after the extracted logical block address is written to once, wherein at least one logical block address in the first partition is unwritten to;
a WORM protected state configured to prevent reset, write, erase, and format commands to all logical block addresses in the first partition; and
the protection module further configured to allow only extracted logical block address protection state transitions from the unprotected state to the auto-protected state, from the unprotected state to the WORM protected state, from the auto-protected state to the unprotected state in response to a reset, from the auto-protected state to the read-only auto-protected state when the extracted logical block address is written to, and from the read-only auto-protected to the WORM protected state when each logical block address in the first partition is written to.

7. The system of claim 6, further comprising a write module comprising executable code stored on the semiconductor device, executed by the processor, and configured to write data to the storage device and perform protection state transitions of the first partition.

8. The system of claim 6, wherein the storage device is selected from the group consisting of hard disk drives, DVD-RW, DVD-RAM, CD-RW, magneto-optical, phase change, holographic, tape cartridge drives, tape cassette drives, and solid-state media.

9. The system of claim 6, wherein the first partition further comprises at least one unit of storage of fixed size.

10. The system of claim 6, wherein the first partition further comprises at least one unit of storage of variable size.

11. A program of executable code stored on a semiconductor device and executed by a processor to perform an operation for writing data to protected partitions of storage media, the operation comprising:
communicating with a host device and receiving write commands for a storage device, the storage device having at least one partition, each partition comprising a plurality of logical block addresses;
extracting a logical block address of a first partition from a SCSI mode page of the write commands;
verifying a protection state of the extracted logical block address; and
allowing write commands according to the protection state of the extracted logical block address, the protection state selected from a plurality of protection states comprising
an unprotected state;
an auto-protected state configured to allow exactly one write operation to the extracted logical block address;
a read-only auto-protected state configured to prevent reset, write, erase, and format commands to the extracted logical block address after the extracted logical block address is written to once, wherein at least one logical block address in the first partition is unwritten to;
a WORM protected state configured to prevent reset, write, erase, and format commands to all logical block addresses in the first partition; and
allowing only extracted logical block address protection state transitions from the unprotected state to the auto-protected state, from the unprotected state to the WORM protected state, from the auto-protected state to the unprotected state in response to a reset, from the auto-protected state to the read-only auto-protected state when the extracted logical block address is written to, and from the read-only auto-protected to the WORM protected state when each logical block address in the first partition is written to.

12. The program of claim 11, further comprising an operation to write data to the storage device and perform protection status transitions of the first partition.

13. A method for writing data to protected partitions of storage media, the method comprising:

communicating with a host device and receiving write commands for a storage device, the storage device having at least one partition, each partition comprising a plurality of logical block addresses;

extracting a logical block address of a first partition from a SCSI mode page of the write commands;

verifying a protection state of the extracted logical block address; and allowing write commands according to the protection state of the extracted logical block address, the protection state selected from a plurality of protection states comprising an unprotected state;

an auto-protected state configured to allow exactly one write operation to the partition;

a read-only auto-protected state configured to prevent reset, write, erase, and format commands to the extracted logical block address after the extracted logical block address is written to once, wherein at least one logical block address in the first partition is unwritten to;

a WORM protected state configured to prevent reset, write, erase, and format commands to all logical block addresses in the first partition; and allowing only extracted logical block address protection state transitions from the unprotected state to the auto-protected state, from the unprotected state to the WORM protected state, from the auto-protected state to the unprotected state in response to a reset, from the auto-protected state to the read-only auto-protected state when the extracted logical block address is written to, and from the read-only auto-protected to the WORM protected state when each logical block address in the first partition is written to.

14. The method of claim 13, wherein the method comprises writing data to the storage device and performing protection status transitions of the first partition.

* * * * *